United States Patent [19]

Westerberg et al.

[11] 4,226,024
[45] Oct. 7, 1980

[54] CALIPER

[75] Inventors: Gerhard Westerberg, Taby; Hans Jacobsen, Solna, both of Sweden

[73] Assignee: Gerhard Westerberg, Taby, Sweden

[21] Appl. No.: 5,976

[22] Filed: Jan. 24, 1979

[30] Foreign Application Priority Data

Jan. 30, 1978 [SE] Sweden ............................ 7801122

[51] Int. Cl.³ .......................... G01B 3/20; G01B 7/02
[52] U.S. Cl. ............................. 33/143 L; 33/125 C; 33/143M
[58] Field of Search ............ 33/143 L, 147 N, 125 C, 33/143 M

[56] References Cited

U.S. PATENT DOCUMENTS

| 3,276,131 | 10/1966 | Hahn ................................. 33/147 N |
| 4,063,362 | 12/1977 | Amsbury et al. ................... 33/147 N |
| 4,143,267 | 3/1979 | Johnson et al. .................... 33/143 L |

FOREIGN PATENT DOCUMENTS 217723 3/1961 Austria ................................. 33/143 L
2720869 6/1978 Fed. Rep. of Germany ........ 33/143 L
2710312 9/1978 Fed. Rep. of Germany ........ 33/143 M

*Primary Examiner*—Willis Little
*Attorney, Agent, or Firm*—Silverman, Cass & Singer, Ltd.

[57] ABSTRACT

Two magnetically sensitive field plates are provided in a caliper to determine the distance between a movable leg and a stationary leg. The field plates are located on the movable leg adjacent grooves in a portion of the caliper which is magnetic and along which the movable leg is moved. Each plate magnetically senses each groove and produces an electrical signal in response thereto. The field plates are arranged relative to each other so that the signals produced therefrom are out of phase with each other, the phase difference between the two signals indicating the direction of travel of the movable leg and the number of signals indicating the magnitude of the movement of the movable leg. Depending on the direction of travel, the number of signals are added or subtracted to determine the distance between the legs.

6 Claims, 8 Drawing Figures

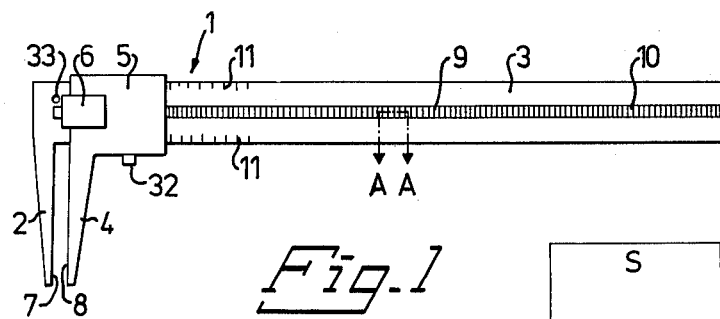
*Fig. 1*
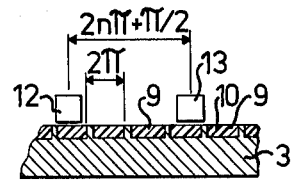
*Fig. 2*
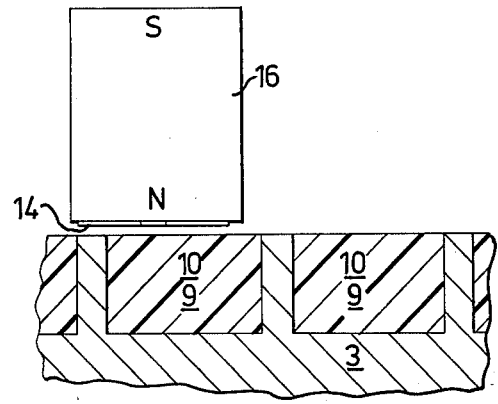
*Fig. 3*
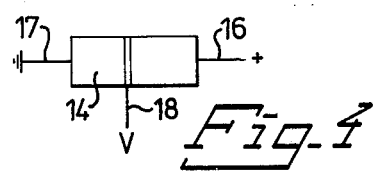
*Fig. 4*
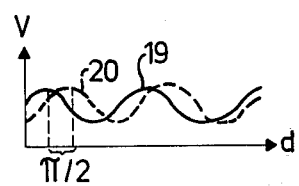
*Fig. 5*
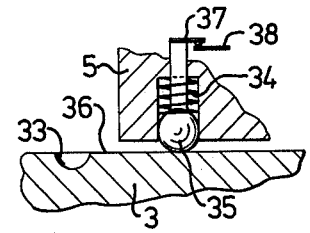
*Fig. 6*
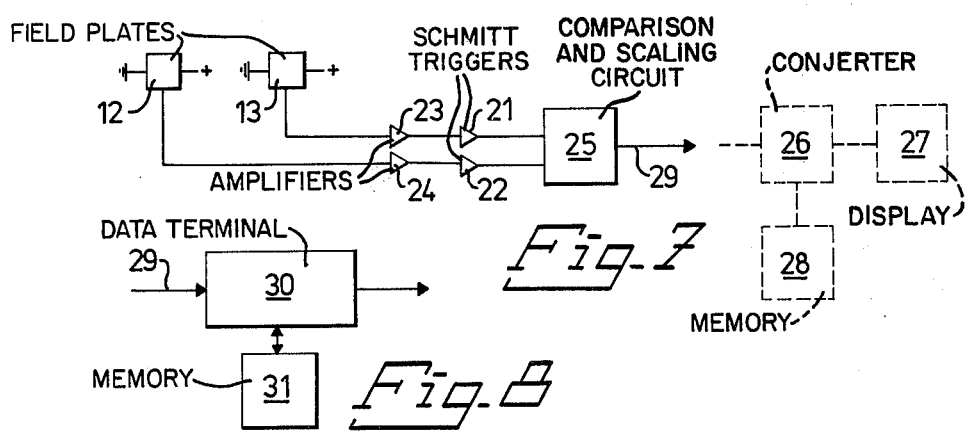
*Fig. 7*
*Fig. 8*

CALIPER

BACKGROUND OF THE INVENTION

This invention relates to a caliper, i.e. an instrument for measuring the diameter of tree stems. The invention, more precisely, relates to a caliper, which is capable by electronic means to read and preferably to record the diameter of the measured stem.

In the most usual method of measurement in a forest one man measures the diameter of a stem by means of a caliper, whereafter a second man writes down the result. These lists of measurement results are later possibly fed into a computer via punched cards, for example.

There exist also calipers, which by electronic means read the diameter of the measured stem. These calipers, however, have the disadvantages above all of being relatively heavy and large, which is an important disadvantage in view of the fact that the calipers must be carried about all the day, and further of consuming relatively much energy, which implies that either large batteries are to be used, which contributes to an increase in weight, or that the batteries must be exchanged often. These disadvantages are the reason why such calipers are applied to a very limited extent.

The present invention eliminates the aforesaid disadvantages.

SUMMARY OF THE INVENTION

The caliper according to the invention substantially has the same weight and design as a conventional caliper for manual reading.

Two field plates are located on a movable leg adjacent grooves in a magnetic portion of the caliper along which the movable leg is moved. The plates produce electrical signals out of phase with each other to indicate the magnitude and direction of movement of the movable leg from which the distance between the stationary and movable leg is determined.

BRIEF DESCRIPTION OF THE DRAWINGS

The invention is described in the following, with reference to the accompanying drawing, in which FIG. 1 is a plan view of a caliper;

FIG. 2 is a section of the caliper shown in FIG. 1 through A—A,

FIG. 3 shows FIG. 2 on an enlarged scale;

FIG. 4 diagrammatically shows a scanning element;

FIG. 5 is a voltage-distance graph showing the phase difference of two signals;

FIG. 6 shows a detail of the caliper shown in FIG. 1;

FIG. 7 is a block diagram of electronic equipment; and

FIG. 8 is a block diagram of preferred additional electronic equipment.

DESCRIPTION OF THE PREFERRED EMBODIMENT

In FIG. 1 a caliper 1 for measuring the diameter of tree stems is shown which comprises a stationary leg 2 with an associated bar 3 and a movable leg 4, which is attached to the bar 3 by a support member 5 and is movable along the bar 3. The caliper further comprises electronic means 6 for reading the distance between the measuring surfaces 7 and 8 respectively, of legs 2, 4 of the caliper 1.

A great number or plurality of grooves 9 are provided in the bar 3 along the length of the bar, along which the support member 5 of the movable leg 4 can be moved. The bar is of a magnetic material at least at the location of the grooves. The grooves preferably are spaced uniformly relative to each other and are located perpendicularly to the direction of movement of the movable leg 4. The extension or width of the grooves in the direction of movement is three to seven times the distance between two adjacent grooves, preferably five times said distance. At a practical embodiment said width is 1-4 mm, preferably 2 mm. The grooves further are filled with a non-magnetic material 10, for example plastic.

The strokes 11 in FIG. 1 indicate one or more possible visual scales.

The electronic means 6 are attached to the support member 5, for example as shown in FIG. 1. They comprise two so-called field plates 12,13, which are rigidly attached to the support member 5 of the movable leg. Said field plates 12,13 are located above said row of grooves 9, as appears from FIG. 2, and positioned in the square or block, which in FIG. 1 is designated by 6.

Field plates in principle are built up of an element 14, the resistance of which depends on the strength of a magnetic field through the element, and of a permanent magnet 16, at one pole end of which the element is located. In this application the function of the field plates are that the magnetic field of the permanent magnet, and therewith the field strength through the element 14, is influenced by the position of the field plate in relation to the grooves 9 and the intermediate spaces between adjacent grooves.

FIG. 4 shows how voltage is connected between the positive pole (+) at 16 and earth or ground at 17, and how voltage V is taken from an element 14 at lead 18.

FIG. 5 shows in principle a voltage-distance diagram or graph, which is obtained from a field plate when it is moved over grooves 9. As is apparent from FIG. 5, a substantially sinusoidal output signal V is obtained where the period of the output signal agrees with the period of the grooves over the length of the bar 3.

The field plates 12,13 further are positioned at such a distance relative to each other along the bar 3, such that the two field plates in relation to the grooves are phase shifted relative to each other. The field plates 12,13 may be located out of phase at an arbitray angle. Preferably the phase difference is 90°. This is exemplified in FIG. 2 where a whole period $2\pi$ is marked in relation to grooves 9 and where the distance between the two field plates 12,13 is $2n\pi + \pi/2$, where n is an integer.

The curve 19 in FIG. 5, for example, shows the output signal from the filed plate 12, and the curve 20 shows the output signal from the other field plate 13. The phase difference as indicated in FIG. 5 is $\pi/2$.

Each one of the output signals from the two field plates 12, 13 is fed to a device, for example a Schmitt-trigger 21,22 for transforming the waves shown in FIG. 5 into pulse trains. Prior to the transformation, the signals are amplified in amplifiers 23,24. The two pulse trains are fed into a comparison and scaling circuit 25. In said comparison circuit the phase position of the two pulse trains relativ eto each other is compared from which the direction of movement of the field plates 12,13 relative to the grooves is detected in a known manner. The scaling circuit preferably counts every pulse which is fed into the scaling circuit, and it preferably counts upward when the distance between the legs 7, 8 increases, and counts downward in the opposite directrion. From the comparison circuit impulses are obtained, which indicate the direction into which the counter shall count. The comparison and scaling circuit 25 is of a suitable known type, but may also consist of special circuits for this purpose. An actual "calculated value", thus, is a measure of the distance between the legs 7,8, provided that the counter started counting from a value in agreement with a certain distance between the legs 7,8. Said "calculated value" can be converted in known manner to an interpretable value on a display, tape or the like.

In FIG. 7 a known device for said last mentioned conversion is designated by 26, and a display or the like is designated by 27. A semiconductor memory 28 of known kind can be connected to the device 26.

According to a preferred embodiment the "calculated value" is passed directly via a connector 29 to a portable data terminal 30 of known type, which comprises a memory 31 shown in FIG. 8. Such a terminal can store the measurements of a whole day or week, and also certain calculations preferably can be carried out with the data terminal. Every measurement value, further, can be provided with codes concerning wood species, ground area etc.

Said known data terminal 30,31 is intended after the completion of the measurements to deliver the contents in the memory 31 to a larger data processing center for processing the information. According to another embodiment, the units or circuits designated by reference characters 21, 22, 23, 24 and 25 are comprised in the portable data terminal.

On the support member 5 of the movable leg 8 a switch 32 (FIG. 1) is located, which upon its actuation effects a signal which is passed to the comparison-scaling circuit 25, whereby the actual calculated value is delivered to the conversion device 26 or, in the preferred alternative, to the data terminal 30.

The bar 3 of a caliper, further, in a position for the zero distance between the two legs 7,8 is provided with a substantially circular recess 33 shown in FIG. 6. The support member 5 of the movable leg 4 is provided with a spring-loaded pin 35 or the like, which abuts the surface 36 of the caliper in which said recess 33 is located. The pin 35 is so located relative to the recess that it is pressed down into the recess 33 when the distance between the legs is zero. When the pin 35 is pressed down by action of a spring 34, two contacts 37,38 are closed, whereby a current circuit is actuated and an impulse is sent to the counter 25 so as to set to zero the same.

Measurement, thus, is carried out as follows. The caliper 1 is adjusted so that the counter 25 is set zero. Thereafter the diameter of a stem is measured. When the legs 7,8 of the caliper contact the stem, the switch 32 is impressed and a measurement value is recorded or shown on a display, tape etc.

At the next measurement the counter must not or need not again be set zero, provided that the current supply to the counter was not broken or removed between the measurements.

The measuring method implies that a low energy consumption is obtained, which in its turn implies the possibility of holding or keeping the weight of the system low. A further essential advantage is that the measuring method is insensitive to different environments such as snow, ice, contaimination etc. and, therefore, has a high operational reliability. Still another advantage is the possibliity of a compact design of the electronic equipment and batteries.

The present invention, thus, offers an instrument for the measurement of tree stems which is very easy to handle, reliable in operation and of relatively light weight.

The invention is not to be regarded restricted to the embodiments described above, but can be varied within its scope defined in the attached claims.

We claim:
1. A caliper for measuring the diameter of tree stems comprising:
    (1) a stationary leg fixed with a bar having a length and a movable leg slidably mounted on said bar by a support member and movable along the length thereof in two opposite directions;
    (2) a plurality of grooves located in the bar for a length of the bar along which the movable leg is movable, the bar being of a magnetic material at least in a portion containing the grooves and the grooves being uniformly spaced from each other and directed perpendicular to the directions of movement of the movable leg; and
    (3) electronic means for measuring the distance the movable leg is moved from the stationary leg, said means comprising:
        (a) two field plates rigidly attached to the support member of the movable leg adjacent said grooves, each field plate magnetically sensing each groove and producing an electrical signal in response thereto, the plates being located relative to each other so that the electrical signals produced thereby in response to the sensed grooves are out of phase from each other, and the phase difference between the produced electrical signals indicating the direction of movement of the movable leg relative to the stationary leg;
        (b) means for converting said electrical signals from the field plates to pulses substantially in phase with said electrical signals;
        (c) comparison and scaling means for comparing the phase relationship of the pulses to determine the direction of travel of the movable leg along the bar and for counting the number of pulses to determine the distance the movable leg is moved from the stationary leg;
        (d) converter means for converting the number of pulses to readable measurement values; and
        (e) portable data terminal means for storing the measurement values.

2. The caliper as claimed in claim 1 in which the amount the field plates are out of phase from each other is approximately 90°.

3. The caliper as claimed in claim 2 in which the grooves are filled with a non-magnetic material.

4. The caliper as claimed in claim 2 in which a surface of said bar is provided with a recess and said support member is provided with a spring loaded pin having one end abutting the surface of the bar, said one end being engagable into said recess and said pin and recess being located so that the one end of the pin engages into said recess when the distance between said stationary and movable legs is zero, said pin being coupled to circuit means for providing a reset to zero signal to said comparison and scaling means when said pin engages into said recess to reset the count of the pulses to zero.

5. The caliper as claimed in claim 2 in which the width of the grooves in the directions of movement of the movable leg is from three to seven times the distance between two adjacent grooves.

6. The caliper as claimed in claim 5 in which the width of the grooves is five times the distance between two adjacent grooves.

* * * * *